Oct. 23, 1956  E. J. DOBBRATZ ET AL  2,768,333
REMOTE CONTROL WIRING SYSTEMS
Filed Dec. 29, 1953
2 Sheets-Sheet 1
*Fig. 1.*
*Fig. 2.*
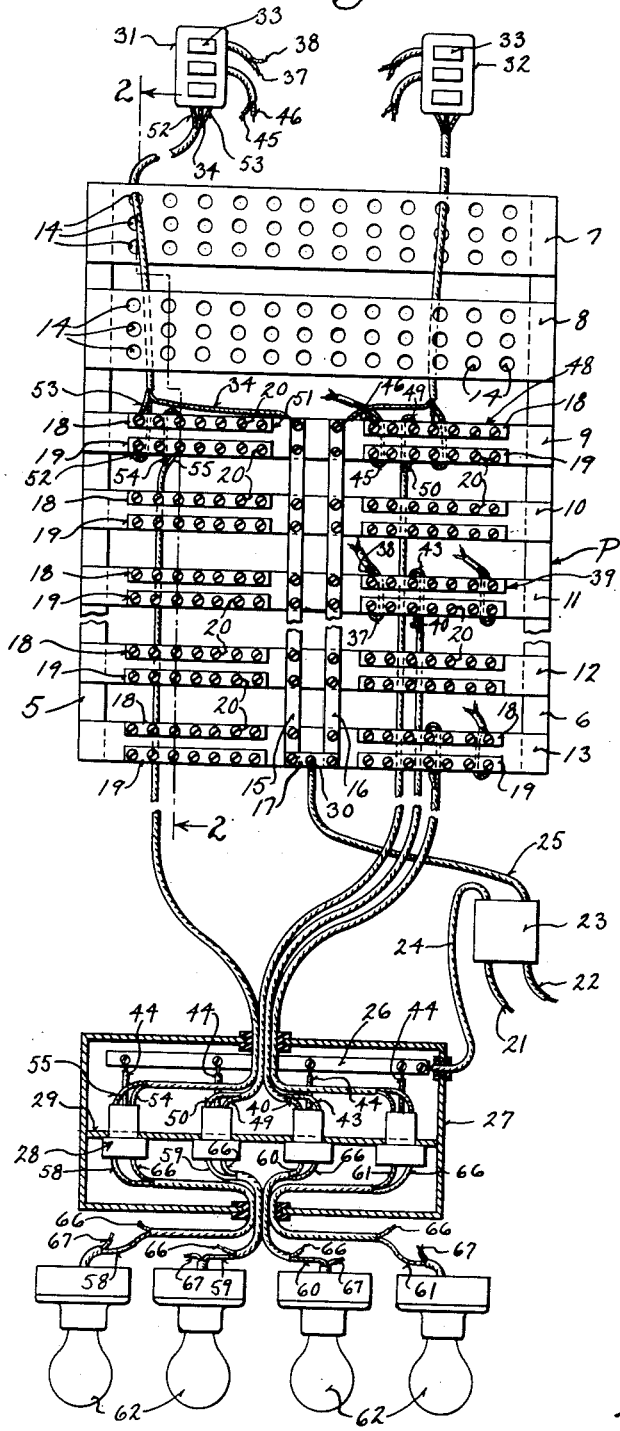
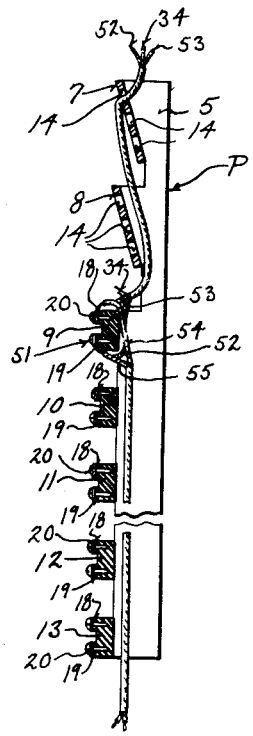
INVENTORS
EDWARD J. DOBBRATZ
THOMAS J. HADY
BY
*Young & Wright*
ATTORNEYS Oct. 23, 1956     E. J. DOBBRATZ ET AL     2,768,333
REMOTE CONTROL WIRING SYSTEMS
Filed Dec. 29, 1953     2 Sheets-Sheet 2

INVENTORS
EDWARD J. DOBBRATZ
THOMAS J. HADY

BY

*Meanny Wright*

ATTORNEYS

United States Patent Office 2,768,333
Patented Oct. 23, 1956

2,768,333

REMOTE CONTROL WIRING SYSTEMS

Edward J. Dobbratz and Thomas J. Hady, Watertown, Wis.

Application December 29, 1953, Serial No. 400,979

2 Claims. (Cl. 317—122)

This invention appertains to remote control wiring systems for homes and other buildings, and more particularly to a novel means for grouping the low voltage wires and relay switches of such systems to facilitate wiring, replacing of parts, etc.

In remote control wiring systems, there are high voltage power circuits (110–125 volts) for the appliance outlets, lights, etc., and low voltage circuits (24 volts) for controlling the opening and closing of the high voltage power circuits through relay switches and in this specification, for the sake of simplicity, wires for the high voltage power circuits will be termed high voltage and the wires in the low voltage circuits will be termed low voltage wires. Such remote control wiring systems have many advantages over wiring systems where the 110 voltage circuits are directly opened and closed through manually actuated switches, such as the reduction of the number of wires carrying high voltage, the proper insulation of these wires with the necessary high cost and labor for installation and the danger incident to the use of high voltage lines leading to manually operated switches. The main objection to remote control wiring systems is the maze of low voltage wires leading from different areas and switches therein in a building to the relay switches and the connection of the proper wires to the relay switches and the difficulty of quickly locating a burned out relay switch after installation for replacement—as well as the difficulty of changing (when desired) the wiring for permitting manually operable switches disposed in one area to control a high voltage power circuit in another desired area.

Therefore, one of the primary objects of my invention is to provide a master panel located at a desired point constructed in a novel manner, whereby the low voltage wires leading from different areas and manually operable switches in such areas can be properly segregated and grouped and wired to the panel with wires leading from the panel to an adjacent box carrying the relay switches.

Another salient object of my invention is to provide a master panel for the low voltage wires leading from different areas embodying locating plates having a series of openings through which are threaded groups of wires leading from certain areas and manual switches and identifying panel plates for each different area carrying conductor strips and binding terminals or clips so that desired wires can be connected to selected and properly identified panel strips and whereby these strips in turn can be electrically connected to properly identified relay switches.

A further object of my invention is to provide a master panel of the above character, so constructed and arranged that the low voltage wires leading to the panel can be readily and easily connected to any selected conductor strips for permitting desired changes to be made for permitting selected switches to control selected areas.

A further important object of my invention is to provide a new means of handling switching controls for a touch control remote wiring system, so that an orderly and workmanship-like procedure can be had to save installation time and work on the job of installing such system.

With these and other objects in view, the invention consists in the novel construction, arrangement and formation of parts as will be hereinafter more specifically described and claimed, and illustrated in the accompanying drawings, in which drawings, Figure 1 is a front elevational view of my master panel showing the same in use with a relay switch box and certain circuits, the box being shown in section.

Figure 2 is a longitudinal sectional view through the master panel, taken on the line 2—2 of Figure 1, looking in the direction of the arrows.

Figure 3:
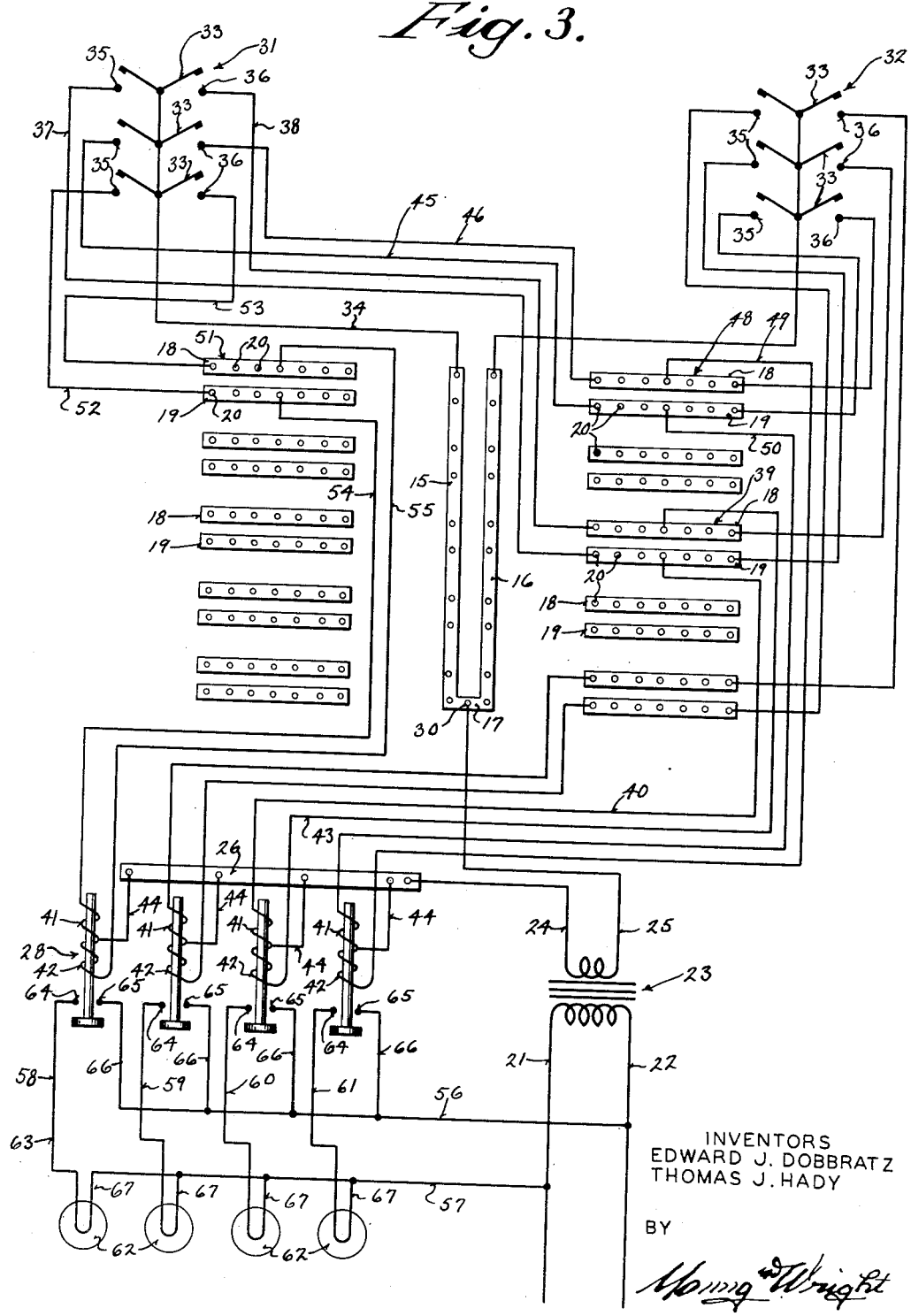
Figure 3 is a schematic view showing the wiring diagram for the circuits illustrated in Figure 1.

Referring to the drawings in detail, wherein similar reference characters designate corresponding parts throughout the several views, the letter P generally indicates the master panel for use in a touch control remote wiring system for use in a home or building. For the sake of simplicity, and to avoid confusion in the drawings, only certain circuits have been illustrated for two areas in a building or home and all references to master switches, fuses and the like, have been eliminated.

The master panel P can be constructed in various manners and from various types of material and parts of the panel will be considered as constructed from dielectric material. The panel P can include spaced parallel longitudinally extending stringers 5 and 6, rigidly secured together by spaced locating plates 7 and 8 and a series of spaced identifying plates 9, 10, 11, 12 and 13. The locating plates 7 and 8 are preferably disposed at an angle to the longitudinal axis of the stringers 5 and 6, so as to facilitate the leading of wires therethrough and down to the identifying boards 9, 10, 11, 12 and 13.

The master panel P is located at a selected desired point and between rafters or studding in a floor, ceiling or wall, and hence the stringers 5 and 6 can be spaced apart a distance equal to the space between wall studding.

Obviously, there can be more or less of the locating boards 7 and 8 and identifying plates 9, 10, 11, 12 and 13 according to the size of a home or building being wired.

The locating boards 7 and 8 are each provided with a series of rows of transversely extending openings 14 and each row of openings is suitably identified by the use of letters of the alphabet and there are preferably three openings in each transverse row and the openings of the transverse rows are in longitudinal alignment so as to, ineffect, also provide longitudinal rows, namely three, and these longitudinal rows can be identified by suitable ordinals. The transverse rows of openings receive wires leading from certain switches in a certain area, and if desired, the wires from one switch in one area can be led through the top opening in one transverse row, the wires from another switch in the second opening and the wires from a third switch in the same area in the third opening.

Now referring to the identifying boards 9, 10, 11, 12 and 13, the same are preferably divided in halves by longitudinally extending conductor strips 15 and 16, which extend transversely across all of said identifying boards, and these conductor strips are electrically connected together by a jumper strip 17 and it can be seen that only one conductor could be provided but to facilitate wiring of the board, as will later appear, it is best to provide two conductor strips. Each identifying board on opposite sides of the conductor strips 15 and 16 constitutes an identifying means for a certain area and is suitably labeled A—B—C etc., the same as the transverse rows of openings in the locating panels 7 and 8, and each of these identifying areas on the identifying boards has secured thereto spaced longitudinally extending conductor strips 18 and 19. Each conductor strip has electrically connected therewith terminals or clips 20 to permit the easy connection of wires to the strips.

As brought out in the objects of this specification, the panel P is utilized for facilitating the wiring of the low voltage circuits for the remote control manual switches. The current for the low voltage circuits is derived from the house or building power lines indicated by the reference characters 21 and 22 leading to a transformer 23 for reducing the voltage from say 110 to 24 volts, and the low voltage wires 24 and 25 leading from the transformer are electrically connected respectively to a conductor strip 26 secured and insulated in a box 27 which houses a gang of relay switches 28. The relay switches can be detachably mounted on a partition plate 29 secured in said box. In actual practice, the box 27 is of such a size as to receive all of the relay switches utilized in a home or building. The wire 25 is electrically connected, as at 30, to the jump strip 17 for the conductor strips 15 and 16, which constitutes a common means potential for all the manually operable touch switches arranged in different areas of a building. In Figures 1 and 3, I have shown two of such switches for two different areas and these switches are indicated by the reference characters 31 and 32. These switches are all of a type now sold in the open market and are of a single pole, double throw, momentary-contact, normally open push button type, and each includes a switch member 33 rockably mounted intermediate its ends so that the switch member when pushed at one end will close a certain circuit and open another circuit, and when pushed at its opposite end will open the first circuit and close the other circuit. In the showing, I have illustrated three of such switch members 33 mounted in a common switch housing for opening and closing power circuits through relays for lights, appliance outlets or the like.

Now referring to the wiring for the switch members of switch 31, it can be seen that the switch members are all electrically connected to the conductor strip 15.

In the drawings, the uppermost switch member 33 controls the opening and closing of power circuits for one area, the intermediate switch member 33 controls the opening and closing of power circuits to another area and the lowermost switch member controls the opening and closing of power circuits to still another area. All of these independent switches are provided respectively with an "on" contact 35 and an "off" contact 36, and hence a wire 37 leads from contact 35 to a bottom conductor strip 19 in one panel area now indicated by the reference character 39 on one of the identification boards, and a wire 38 leads from the "off" contact 36 to the top conductor strip 18 of identification plate 11. Electrically connected to any one of the binding posts or clips 20 of strip 19 of area 39 is a wire 40 which leads to one terminal of a relay coil 41 of one of the relays 42, and this coil 41 when energized functions to close the desired relay switch and this relay as in all of the relays is provided with a second relay coil 42, which when energized opens the relay switch. The terminal of the coil 42 has electrically connected therewith a wire 43 which is in turn electrically connected by any one of the binding posts 20 to the upper conductor strip 18 of area 39. The inner terminals of both coils 41 and 42 are electrically connected by a wire 44 with the conductor strip in the relay box 27, and this strip, as heretofore stated, is electrically connected by wire 24 to the relay.

Now considering this low voltage circuit for the moment, when it is desired to close a high voltage power circuit in a certain area, the switch member 33 (see Figure 3) of the uppermost switch is slightly pressed on the left hand side and the flow of current through this low voltage circuit as follows: wire 25, conductor strip 15, wire 34, switch member 33, contact 35, wire 37, conductor strip 19, wire 40 through relay coil 41, wire 44, strip 26, wire 24 to transformer. When it is desired to open this high voltage power circuit, the uppermost switch member 33 is pressed down at the right hand side and current flow is as follows: from transformer wire 25, conductor strip 15, wire 34, switch member 33, contact 36, wire 38, conductor strip 18, wire 43, through coil 42 to wire 44, conductor strip 26 back to transformer 23 through wire 24.

The intermediate switch member 33 can be utilized for controlling the high powered circuit for a different area and hence contact 35 of the intermediate switch has electrically connected thereto a wire 45, which is electrically connected to the lower conductor strip 19 of identification board 9 and a certain area now identified by the reference character 46. The "off" contact 36 of the intermediate switch has electrically connected thereto a wire 46, which is electrically connected with the upper conductor strip 18 for area 48. These strips 18 and 19 for area 48 have electrically connected thereto wires 49 and 50 which lead respectively to the outer terminals of coils 41 and 42 of another selected relay; and, as in all instances, the inner terminals of the coils are connected by wire 44 to strip 26. Hence, it can be seen that upon the operation of switch member 33 for the intermediate switch a second relay is controlled.

The lowermost switch member 33 can be utilized for controlling a third area now indicated by the reference character 51 on identification board 9, and the "off" and "on" contacts 35 and 36 for this bottom switch member have electrically connected therewith wires 52 and 53 which are, in turn, electrically connected with conductor strips 19 and 20 of area 51 and these strips are in turn electrically connected to the opposite terminals of a desired relay by wires 54 and 55. So far, it can be seen that switches in a common switch housing can be utilized for controlling different areas.

Now referring to switch 32, it can be seen that the same is identical with switch 31 but is located in a different part of the building than switch 31 and that the wires from the "on" and "off" contacts of these switches can lead to any selected area or areas, and hence the wiring for this switch will not be described in detail. It is obvious, that any number of switches 31 and 32 can be provided for the home or other building.

By again referring to Figure 3 and to the high voltage power circuits, it can be seen that branch wires 56 and 57 are electrically connected to wires 21 and 22 and that these wires feed different high voltage power circuits as indicated by the reference characters 58, 59, 60 and 61. In each instance, I have only shown one light 63 in each of these high voltage power circuits, and it is, of course, to be understood that any number of lights or appliance outlets can be in each one of these circuits. Each circuit includes a wire 63 which leads to one terminal 64 of a relay switch and the other terminal 65 of each relay switch is connected by a wire 66 to the line 56. Common wire 57 is connected in each high voltage power circuit by branch wire 67.

Now referring to Figure 1, and more specifically to the panel, it can be seen that wires from the lowermost member 33 of switch 31 are led through a desired opening which is properly identified in the upper locating plate 7 and that these wires are then led and electrically connected to the conductor strips 18 and 19 in a certain area on an identification plate which bears the same identification as the opening through which these wires are led in plate 7. The wires from the other switch members 33 are led through other properly identified openings in either panel 7 or 8, and are then led to identically identified areas on identification plates 9, 10, 11, 12 and 13, as the case may be. During the wiring of a house or building, an area properly identified on an indicating plate is always utilized for a high voltage power circuit in a certain area and hence the wires from a particular switch can be led and electrically connected to the conductor plates 18 and 19 for any selected area of an identification plate.

In effect, the master panel P can be best described as the nerve center of a low voltage electric wiring system in a house or building, in that all low voltage wires leading to the switching facilities or to relay switches enter into and have their terminals in selected areas on the master panel and the wires are readily changeable on this panel without recourse to any outside adjustments or changing of switches themselves. The box for the relays and the master panel P coordinates high voltage and low voltage in an orderly fashion, so as to coincide with the identified areas on the master panel. This master panel permits the installation of a remote control wiring system more conveniently, and with less confusion and allows for desired changes. Once the low voltage wires from the switch boxes are located in their respective openings in the locating boards 7 and 8, no error in arrangement on the panel can be made, as these wires can then be led to any identified area on the plates 9, 10, 11, 12 and 13 without confusion or mixup.

Various changes in details may be made without departing from the spirit or the scope of this invention, but what we claim as new is:

1. In a remote control wiring system including low voltage circuits and switches therefor and relays in said circuits, and high voltage power circuits controlled by the relays; a master panel including side stringers locating boards secured to said side stringers having a series of rows of identifying openings, identifying plates on said stringers provided with identified areas corresponding to the identifying openings and said areas being provided with conductor strips having terminals, said locating boards being disposed at an angle to said identifying plates, the low voltage wires for independent low voltage circuits being led through selected identifying openings and then to selected conductor strips in identified areas.

2. In a remote control wiring system including low voltage circuits and switches therefor and relays in said circuits, and high voltage power circuits controlled by the relays; a master panel including vertically extending side stringers, horizontally disposed locating boards secured to said stringers and having a series of rows of identifying openings, a series of horizontally disposed identifying plates provided with identified areas corresponding to the identifying openings and said areas being provided with conductor strips having terminals, said locating boards being disposed rearwardly at an angle to said identifying plates, the low voltage wires for independent low voltage circuits being led through selected identifying openings and then to selected conductor strips in identified areas.

References Cited in the file of this patent
UNITED STATES PATENTS

| Re. 23,797 | Miller | Mar. 9, 1954 |
| 1,788,567 | Egger | Jan. 13, 1931 |
| 2,003,447 | Kelsay | June 4, 1935 |